US009008061B2

(12) United States Patent
Takahashi et al.

(10) Patent No.: US 9,008,061 B2
(45) Date of Patent: Apr. 14, 2015

(54) POSITIONING DEVICE AND POSITIONING METHOD

(75) Inventors: Makoto Takahashi, Yokosuka (JP); Jun Hashimoto, Yokohama (JP); Kentaro Itagaki, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 138 days.

(21) Appl. No.: 13/581,649

(22) PCT Filed: Apr. 20, 2011

(86) PCT No.: PCT/JP2011/059712
§ 371 (c)(1),
(2), (4) Date: Aug. 29, 2012

(87) PCT Pub. No.: WO2011/148741
PCT Pub. Date: Dec. 1, 2011

(65) Prior Publication Data
US 2012/0327922 A1      Dec. 27, 2012

(30) Foreign Application Priority Data

May 26, 2010    (JP) .................................. 2010-121004

(51) Int. Cl.
*H04W 64/00* (2009.01)
*G01S 19/48* (2010.01)
*G01S 5/02* (2010.01)

(52) U.S. Cl.
CPC ............... *G01S 19/48* (2013.01); *G01S 5/0263* (2013.01); *G01S 5/021* (2013.01)

(58) Field of Classification Search
None
See application file for complete search history.

(56) References Cited

U.S. PATENT DOCUMENTS

| | | | |
|---|---|---|---|
| 2004/0248587 A1* | 12/2004 | Niemenmaa | 455/456.1 |
| 2007/0150192 A1* | 6/2007 | Wakamatsu et al. | 701/213 |
| 2009/0303112 A1* | 12/2009 | Alizadeh-Shabdiz | 342/357.01 |
| 2009/0303113 A1 | 12/2009 | Alizadeh-Shabdiz | |
| 2009/0303114 A1 | 12/2009 | Alizadeh-Shabdiz | |

(Continued)

FOREIGN PATENT DOCUMENTS

| | | |
|---|---|---|
| JP | 2007 107890 | 4/2007 |
| JP | 2008-306464 | 12/2008 |

(Continued)

OTHER PUBLICATIONS

International Search Report Issued Jul. 12, 2011 in PCT/JP11/59712, filed Apr. 20, 2011.

*Primary Examiner* — Hassan Phillips
*Assistant Examiner* — Ayanah George
(74) *Attorney, Agent, or Firm* — Oblon, McClelland, Maier & Neustadt, L.L.P.

(57) ABSTRACT

A positioning device for measuring a position includes a WLAN positioning calculation unit that performs first positioning, based on first radio waves from access points; a satellite positioning unit that performs second positioning, based on second radio waves from satellites; a positioning result determination unit that determines whether a positioning result by the WLAN positioning calculation unit exists within a predetermined range from position information or a measured position, based on the position information to be obtained during the second positioning by the satellite positioning unit or the measured position by the satellite positioning unit; and a positioning result adoption determination unit that determines whether the positioning result is adopted, based on a determined result by the positioning result determination unit.

12 Claims, 7 Drawing Sheets

(56) References Cited

U.S. PATENT DOCUMENTS

| | | |
|---|---|---|
| 2009/0303115 A1 | 12/2009 | Alizadeh-Shabdiz |
| 2009/0303119 A1 | 12/2009 | Alizadeh-Shabdiz |
| 2009/0303120 A1 | 12/2009 | Alizadeh-Shabdiz |
| 2009/0303121 A1 | 12/2009 | Alizadeh-Shabdiz |
| 2010/0052983 A1 | 3/2010 | Alizadeh-Shabdiz |
| 2010/0082238 A1* | 4/2010 | Nakamura et al. ............ 701/208 |

FOREIGN PATENT DOCUMENTS

| | | |
|---|---|---|
| JP | 2009 536808 | 10/2009 |
| WO | 2009 149417 | 12/2009 |

* cited by examiner

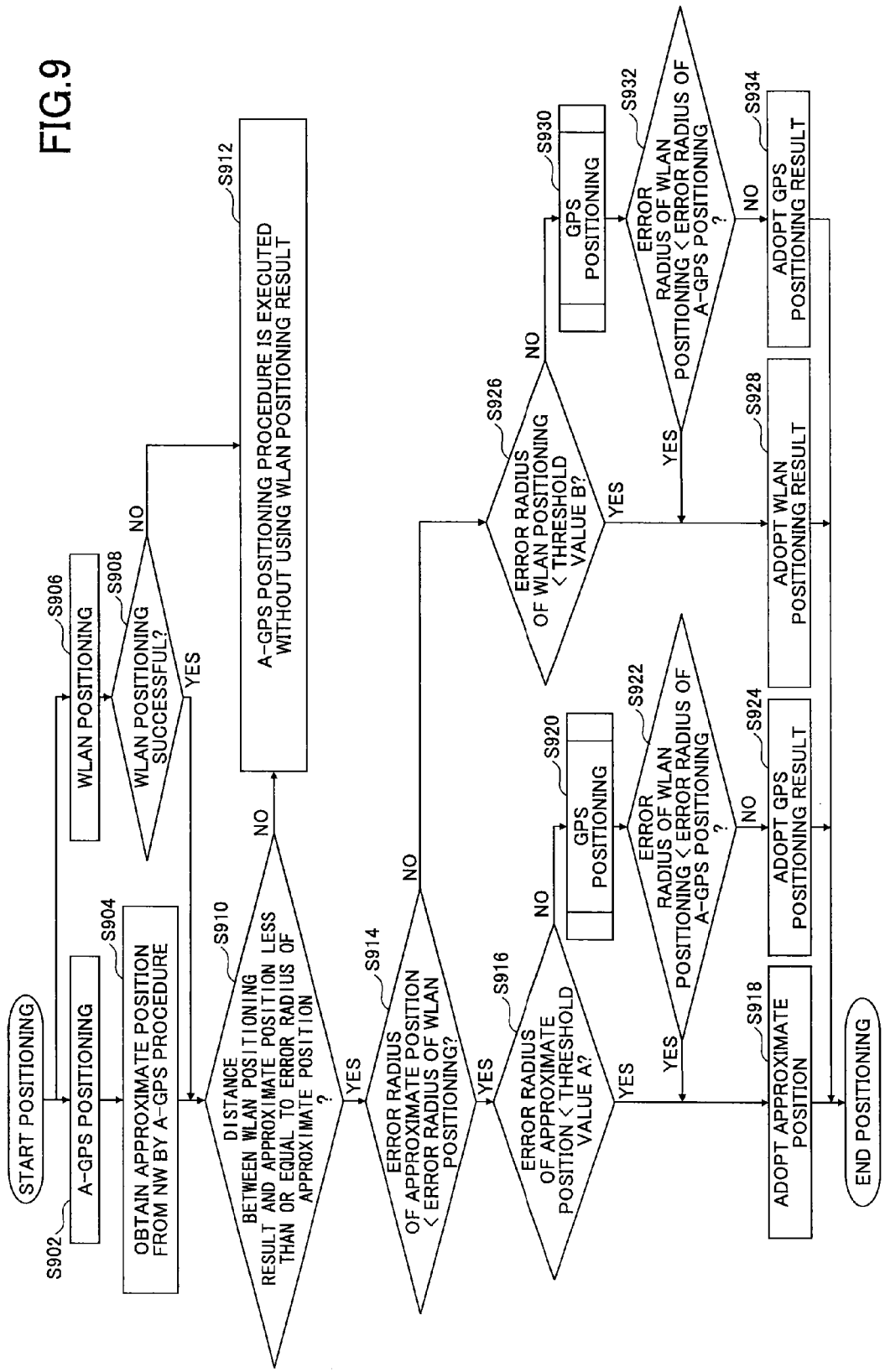

POSITIONING DEVICE AND POSITIONING METHOD

TECHNICAL FIELD

The present invention relates to a positioning device.

BACKGROUND ART

The Global Positioning System (GPS) has been known as highly accurate positioning technology. The GPS is the positioning technology that utilizes radio waves transmitted from GPS satellites. In the GPS, a positioning error becomes large for an indoor environment where a number of visible satellites that can be utilized for positioning is small. For example, in an indoor environment, it is possible that the positioning error becomes several hundred meters. In addition, the positioning itself may become impossible.

In order to realize highly accurate positioning in an indoor environment as well as in an outdoor environment, positioning technology has been focused on such that it utilizes a wireless local area network (WLAN) (hereinafter, referred to as the "WLAN positioning").

In the WLAN positioning, a position is estimated by utilizing radio wave information from a WLAN access point. In the WLAN positioning, since WLAN access points are not connected, the positioning can be performed with respect to all the WLAN access points whose radio wave information can be utilized.

RELATED ART DOCUMENT

Patent Document

Patent document 1: Japanese Patent Laid-Open Application No. 2008-306464
Patent document 2: Japanese Patent Laid-Open Application No. 2009-536808

SUMMARY OF THE INVENTION

Problem to be Solved by the Invention

The WLAN positioning utilizes a database where installation positions of WLAN access points are registered. For example, the installation positions can be the positions that are estimated based on radio waves from WLAN access points measured at plural locations. For example, they may be estimated based on received signal intensities.

A positioning device obtains identifiers of the WLAN access points from radio waves to be transmitted by the WLAN access points. The positioning device obtains information regarding the installation positions of the WLAN access points corresponding to the identifiers from the database. The positioning device determines the position of the positioning device itself based on the information regarding the installation positions.

The positioning device can ensure the reliability of the result of the WLAN positioning by frequently scanning the WLAN access points.

Further, an administrator of the database can ensure the reliability of the result of the WLAN positioning by frequently updating the database.

However, by frequently performing the scanning of the WLAN access points, the power consumption is increased. Further, it is actually difficult for the administrator of the database to manage all the locations of the WLAN access points. As a method of increasing the number of the WLAN access points that are registered in the database, a method can be considered in which users in general are allowed to register. However, it is difficult for the side of the administrator to determine whether a registration is made by a malicious user or by an innocent user. Therefore, it is not preferable to adopt the method in which the users in generall are allowed to register.

Whether the position identified by the WLAN positioning is reliable or not depends on whether the installation positions of the WLAN access points registered in the database are correct or not. For example, when a WLAN access point is moved to a completely different position, but the installation position registered in the database is not updated, the positioning is performed, while assuming that the installation position of the WLAN access point has not been changed from the installation position prior to the WLAN access point being moved. As a consequence of the positioning being performed while assuming that the installation position is the position prior to being moved, the position of the positioning device is identified to be a position that is completely different from the actual position.

The present invention has been accomplished in view or the above-described problems. An objective of the present invention is to provide a positioning device and a positioning method with which it is possible to determine whether a position identified by WLAN positioning is reliable.

Means for Solving the Problem

The positioning device is a positioning device for measuring a position including a WLAN positioning calculation unit that performs first positioning based on first radio waves from access points;

a satellite positioning unit that performs second positioning based on second radio waves from positioning satellites;

a positioning result determination unit that determines whether a positioning result of the WLAN positioning calculation unit is within a predetermined range from position information or from a determined position, based on the position information to be obtained when the positioning is performed by the satellite positioning unit or the determined position obtained by the satellite positioning unit; and a positioning result adoption determination unit that determines whether the positioning result is to be adopted, based on a determination result by the positioning result determination unit.

The method is a method for a positioning device that measures a position, the method including a WLAN positioning calculation step of performing first positioning based on first radio waves from access points;

a satellite positioning step of performing second positioning based on second radio waves from satellites;

a positioning result determination step of determining whether a positioning result of the WLAN positioning calculation step is within a predetermined range from position information or from a determined position, based on the position information to be obtained when the positioning is performed by the satellite positioning step or the determined position obtained by the satellite positioning step; and a positioning result adoption determination step of determining whether the positioning result is to be adopted, based on a determination result by the positioning result determination step.

Effect of the Present Invention

According to the disclosed positioning device and positioning method, it is possible to determine whether a position identified by the WLAN positioning is reliable.

BRIEF DESCRIPTION OF THE DRAWINGS

FIG. 9 is a flowchart illustrating an example of an operation of the positioning device according to the embodiment.

EMBODIMENTS FOR CARRYING OUT THE INVENTION

Next, a configuration for implementing the present invention is explained by the following embodiment, while referring to the figures. Here, in all the figures for illustrating the embodiment, for elements that have the same function, the same reference code is used, and overlapped explanations are omitted.

<Embodiment>
<System>

A system is explained to which a positioning device 100 according to the embodiment is applied.

Figure 1:
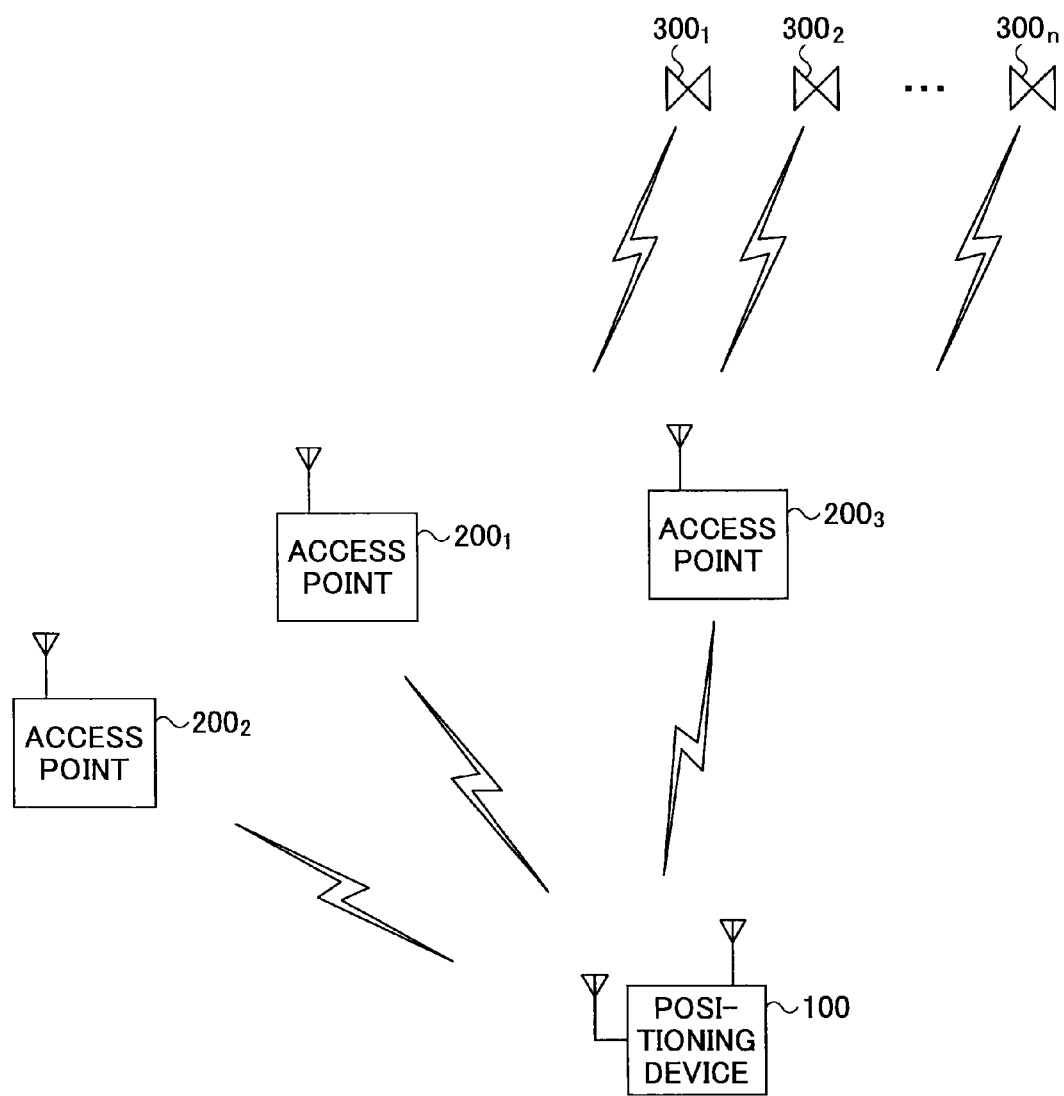
FIG. 1 is an explanatory diagram showing an example of a system according to an embodiment.

FIG. 1 shows the system to which the positioning device 100 is applied.

The system includes access points $200_m$ (m is an integer such that m>0). The access point may also be referred to as a "base unit," a "base station," or a "station," for example. The positioning device 100 performs positioning based on distances between the positioning device 100 and the detected access points $200_m$. FIG. 1 shows, as an example, a case where m=3. Here, m may be less than or equal to two, or greater than or equal to four. For example, when m=1 or 2, an area where the positioning device 100 is supposed to be positioned can be obtained by the distance between the corresponding access point $200_m$ and the positioning device 100. Further, the accuracy of the positioning is improved as the value of m becomes larger.

The positioning device 100 may be mounted on a portable terminal device, on a portable information terminal (Personal Digital Assistants: PDA), or on a personal computer (PC).

When the positioning device 100 is mounted on the portable terminal device, position information can be obtained even in an indoor environment by performing the positioning based on the distances between the portable terminal device and the detected access points $200_m$. Since the position information can be obtained even in the indoor environment, a service can be provided based on the position information in the indoor environment.

Further, the positioning device 100 measures the position of the positioning device 100 itself by positioning signals transmitted by GPS satellites $300_1$-$300_n$ (n is an integer such that n>3). The position information may be represented by the longitude and latitude. In addition, the position information may be indicated by an altitude.

For example, the positioning device 100 may perform the positioning based on a stand-alone positioning method. In the stand-alone positioning method, information that may be required for the positioning calculations is obtained by decoding the positioning signals. Currently, approximately thirty GPS satellites are circling around the earth at a height of about 20,000 kilometers in the sky. There are six orbital planes, each inclined 55 degrees. In each of the orbital planes, four or more GPS satellites are evenly spaced. Therefore, at least five or more GPS satellites can always be observed anywhere on the earth, provided that the sky is open above that position.

Further, for example, the positioning device 100 may perform the positioning by an assisted GPS (A-GPS) method. In the A-GPS, data that is required for the positioning device 100 to perform the positioning is transmitted from a network (not shown in the figure). The data may be referred to as assist information. The data includes, for example, area information of a base station or orbital information of the GPS satellite $300_n$. The area information of the base station includes, for example, approximate location information of the positioning device 100 and information regarding an error in the approximate location information. With that data, the process of decoding the positioning signals can be omitted.

<The Positioning Device>

Figure 2:
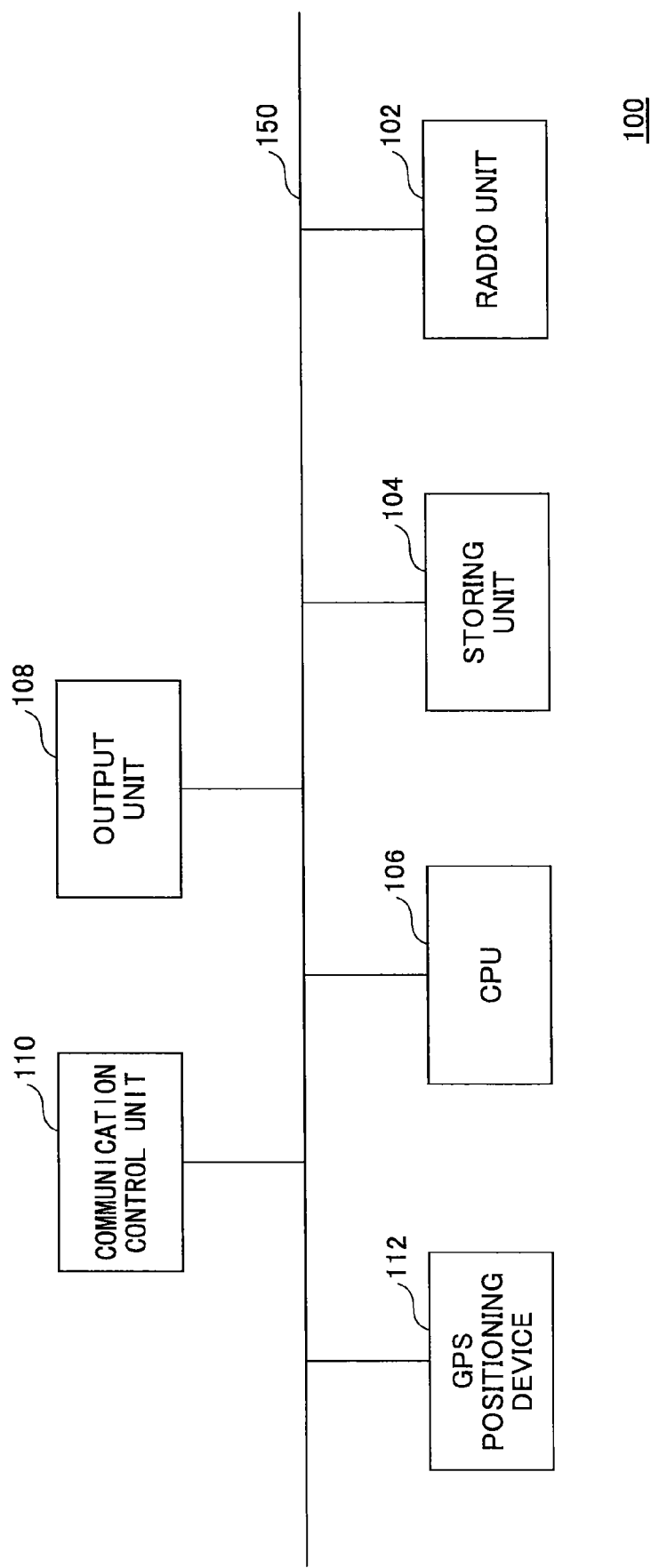
FIG. 2 is a configuration diagram showing an example of a hardware configuration of a measurement device according to the embodiment.

FIG. 2 shows the positioning device 100 according to the embodiment. FIG. 2 mainly shows a hardware configuration.

The positioning device 100 includes a radio unit 102; a storing unit 104; a central processing unit (CPU) 106; an output unit 108; a communication control unit 110; and a GPS positioning device 112. The functional blocks are connected by the bus 150.

The central processing unit 106 performs controls of the radio unit 102, the storing unit 104, the output unit 108, the communication control unit 110, and the GPS positioning device 112. The central processing device 106 functions in accordance with programs stored in the storing unit 104, and thereby the central processing device 106 performs predetermined processes.

The radio unit 102 performs wireless communication in a predetermined wireless communication scheme between the radio unit 102 and the access point $200_m$ by the control of the central processing unit 106. The wireless communication scheme includes a wireless LAN. Standards of the wireless LAN include the IEEE 802.11 and the IEEE 802.15. However, the wireless LAN may comply with any of the standards. The radio unit 102 converts information generated by the communication control unit 110 into a wireless signal, and the radio unit 102 transmits the wireless signal. Further, the radio unit 102 converts a wireless signal from the access point $200_m$ into a baseband signal. The radio unit 102 measures a received signal strength indication (or a received signal strength indicator (RSSI)) of the wireless signal from the access point $200_m$.

The storing unit 104 includes applications. Each of the applications is software including functions for performing tasks executed on the positioning device 100. Further, the storing unit 104 stores information regarding the access points, which have been detected in corresponding channels. Further, the storing unit 104 stores an identifier of the access point $200_m$ that can be set in the positioning device 100. The identifier includes a service set ID (SSID) and an extended SSID (ESSID). The identifier is not limited to the service set ID (SSID) or the extended SSID (ESSID), provided that the access point can be identified with the identifier.

The output unit 106 outputs position information calculated by the positioning device 100. For example, the output unit 106 may output the information to a device on which the positioning device 100 is mounted. When the device is a portable terminal device, a service can be provided based on the input position information by outputting the information to the device on which the positioning device 100 is mounted. For example, it can be considered to transmit various information items suitable for a user's current position and time.

The communication control unit 110 generates information to be transmitted when the positioning device 100 detects the access point. In addition, the communication control unit 110 analyzes a signal received from the detected access point. For example, information to be transmitted during the detection of the access point $200_m$ includes a probe request in a case where an active scan is performed. The probe request may include an identifier of the access point to be detected. The probe request may include information for requesting a response from the access point located in the vicinity of the positioning device 100. Further, for example, when the access point $200_m$ is to be detected, a signal to be transmitted may include a reassociation request for an active scan or for a passive scan.

For example, a signal to be received from the detected access point includes a probe response for performing the active scan. The probe response may include the identifier of the access point that transmits the probe response. Further, for example, the signal to be received from the detected access point includes a beacon in the passive scan. The beacon may include the identifier of the access point that transmits the beacon.

When the active scan is performed, the communication control unit 110 controls the radio unit 102 so that the probe request is transmitted for each channel. Further, when the passive scan is performed, the communication control unit 110 causes the radio unit 102 to scan a frequency band, so that the beacon signals can be detected for the corresponding channels.

The GPS positioning device 112 measures the position of the positioning device 100 in accordance with a control signal (positioning command) to be input by the central processing unit 106. For example, the GPS positioning device 112 calculates distances (pseudo-distances) from the plural GPS satellites $300_1$-$300_n$ to the GPS positioning device 112 by receiving radio waves from the plural GPS satellites $300_1$-$300_n$, by the stand-alone positioning method. The GPS positioning device 112 performs the positioning of the positioning device 100 on which the GPS positioning device 112 is mounted, based on the pseudo-distances. The signals emitted by the GPS satellites $300_1$-$300_n$ reach the GPS positioning device 112 after the corresponding time periods have been spent for the radio waves to propagate through the distances between the GPS satellites $300_1$-$300_n$ and the GPS positioning device 112. Therefore, if the time periods required for the radio-wave propagations for the corresponding GPS satellites $300_1$-$300_n$ can be obtained, the position of the GPS positioning device 112 can be obtained by the positioning calculation. For example, by the radio waves emitted from the plural GPS satellites $300_1$-$300_n$, a distance measuring unit of the GPS positioning device 112 measures the distances between the corresponding GPS satellites $300_1$-$300_n$ and the GPS positioning device 112. Then, the position of the GPS positioning device 112 is obtained by a positioning calculation unit, based on the distances obtained by the distance measuring unit.

Further, the GPS positioning device 112 may perform the positioning by the A-GPS method. In the A-GPS method, the data required for the GPS positioning device 112 to perform the positioning is transmitted from the network (not shown). The data includes, for example, the area information of the base station and the orbit information of the GPS satellite $300_n$. The area information of the base station includes, for example, the approximate location information of the positioning device 100 and the information regarding the error in the approximate location information. The positioning result may be represented in terms of the latitude and longitude. In addition, the position information may be indicated by the altitude. The GPS positioning device 112 inputs the position information to the CPU 106.

<Functions of the Positioning Device>

The processes performed by the positioning device 100 include a process of scanning a frequency band (hereinafter, referred to as the "frequency band scanning process") so as to detect the access point $200_m$. In the frequency band scanning process, the frequency band is measured. The frequency band scanning process includes a process for searching for the channels.

Further, the processes performed by the positioning device 100 include a process of obtaining the position of the positioning device 100 by obtaining the distances between the positioning device 100 and the access points, which have been detected as the result of the frequency band scanning process. For example, the positioning device 100 obtains the position of the access point from the identifier of the access point $200_m$. The positioning device 100 may obtain the distance between the positioning device 100 and the access point, based on the position of the access point and the reception strength of the radio signal transmitted by the access point $200_m$. When the position of the access point $200_m$ is required for obtaining the distance, the position of the access point $200_m$ may be stored in the positioning device 100 in advance, or it may be obtained by another method. For example, the position may be obtained by the portable terminal device on which the positioning device 100 is mounted. For example, the position may be obtained by the portable terminal device by accessing the server storing the position information of the access points. The portable terminal device may perform wireless communications by a predetermined wireless communication scheme. For example, the wireless communication scheme may include the Global System for Mobile Communications (GSM), the Wideband Code Division Multiple Access (WCDMA), or the Long Term Evolution (LTE). Additionally, the position information of the access point $200_m$ may be obtained by the WLAN.

Further, the processes performed by the positioning device 100 include a process of determining whether the position obtained by the WLAN positioning (hereinafter, referred to as the "WLAN positioning result") is reliable. For example, the positioning device 100 may determine whether the WLAN positioning result is reliable by utilizing the area information of the base station to be obtained, when the GPS positioning device 112 performs the positioning based on the A-GPS method. Further, for example, the positioning device 100 may determine whether the WLAN positioning result is reliable by utilizing the positioning result (position history) by the GPS positioning device 112.

Additionally, the processes performed by the positioning device 100 include a process of determining whether the accuracy of the WLAN positioning result is high. For example, the positioning device 100 may determine whether the position of the WLAN positioning is highly accurate, based on a positioning error (error radius) of the WLAN positioning result.

Figure 3:
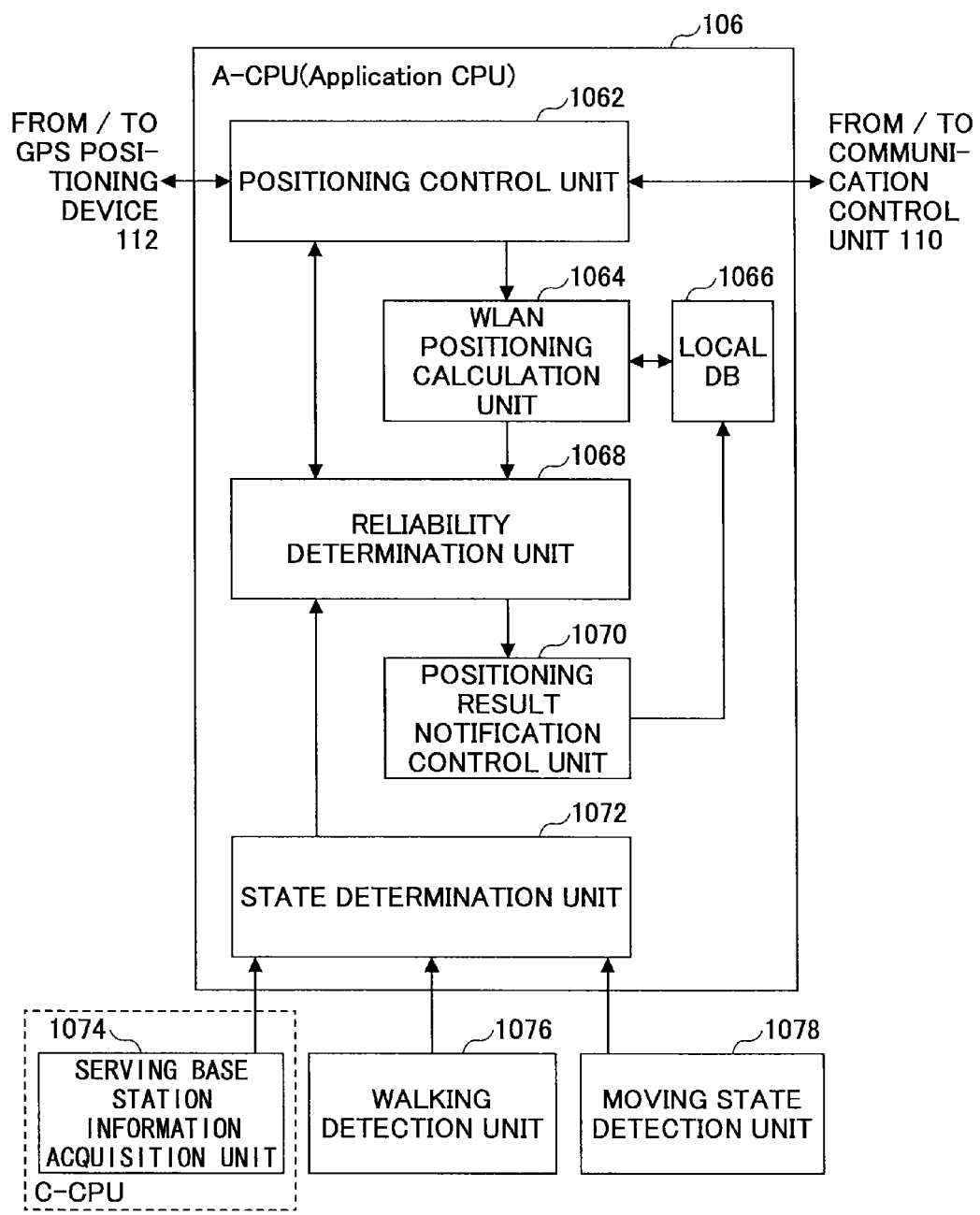
FIG. 3 is a functional block diagram showing an example of the measurement device according to the embodiment.

FIG. 3 is a functional block diagram showing functions of the positioning device 100. FIG. 3 mainly shows the functions performed by the central processing unit 106.

When the positioning device 100 is mounted on the portable terminal device, the portable terminal device provides suitable services and contents depending on the user's position and environment. The process of providing the suitable services and contents may be performed by the software. The services are performed by integrating various geographical information items with the position information and the contents information in real time. The geographic information is utilized in a field, such as disaster prevention, security, and transportation, by using the mobile communication technology. The utilization of the geographic information is called a location based service (LBS).

The social infrastructures and major technical issues required for realizing the LSB include high-precision three dimensional space data; a seamless positioning system that can obtain a position in a wide range of spaces including an outdoor environment and an indoor environment; a communication system; a terminal; and displaying technology.

As an example of the seamless positioning system, the positioning by utilizing the wireless LAN can be considered. The positioning device 100 performs the positioning by utilizing the wireless LAN. Further, the positioning device 100 performs the GPS positioning. The GPS positioning may be the A-GPS positioning. The positioning device 100 determines the reliability of the WLAN positioning result based on the assist information that is obtained when the A-GPS positioning is performed. The determination of the reliability may be referred to as filtering.

Further, the GPS positioning may be the stand-alone positioning, positioning by an auto GPS, single-shot positioning, or tracking. The positioning device 100 determines the reliability of the WLAN positioning result based on the positioning history by the GPS positioning. The determination of the reliability may be called "filtering."

The positioning device 100 includes a positioning control unit 1062. The positioning control unit 1062 is connected to the GPS positioning device 112 and the communication control unit 110. The positioning control unit 1062 controls the GPS positioning device 112. When the GPS positioning device 112 performs the positioning by the stand-alone positioning method, the positioning control unit 1062 obtains the positioning result and inputs the positioning result to a reliability determination unit 1068. In addition, when the GPS positioning device 112 performs the positioning by the A-GPS method, the positioning control unit 1062 obtains the assist information to be utilized when the positioning by the A-GPS method is performed. The positioning control unit 1062 inputs the assist information to the reliability determination unit 1068.

Further, the positioning control unit 1062 controls the communication control unit 110. The positioning control unit 1062 obtains the identifiers of the access points, and the received signal strengths of the access points. The positioning control unit 1062 inputs the identifiers of the access points and the received signal strengths of the access points to a WLAN positioning calculation unit 1064.

The positioning device 100 includes the WLAN positioning calculation unit 1064. The WLAN positioning calculation unit 1064 is connected to the positioning control unit 1062. The WLAN positioning calculation unit 1064 identifies the position of the positioning device 100 based on the identifiers of the access points input by the positioning control unit 1062 and the received signal strengths of the access points. For example, the WLAN positioning calculation unit 1064 obtains the position information of the access points corresponding to the identifiers of the access points. For example, the WLAN positioning calculation unit 1064 obtains the position information corresponding to the identifiers of the access points input by the position control unit 1062, by referring to a table in which the identifiers of the access points stored in a local database (DB) 1066 and the positions of the access points are associated. The position is identified based on the position information and the received signal strengths of the access points. The WLAN positioning calculation unit 1064 inputs the WLAN positioning result to the reliability determination unit 1068.

The positioning device 100 includes the local database 1066. The local database 1066 is connected to the WLAN positioning calculation unit 1064. The local database 1066 stores the identifiers of the access points and the positions of the access points, while associating the identifiers of the access points and the positions of the access points. The information where the identifiers of the access points and the positions of the access points are associated may be obtained by the portable terminal device on which the positioning device 100 is mounted by accessing a server connected to a network. When the information is obtained by accessing the network, the local database 1066 is not always necessary. The network includes the Internet. The association between the identifiers of the access points and the positions of the access points may be provided from the base station.

The positioning device 100 includes the reliability determination unit 1068. The reliability determination unit 1068 is connected to the positioning control unit 1062 and the WLAN positioning calculation unit 1064. The reliability determination unit 1068 determines the reliability of the WLAN positioning result input by the WLAN positioning calculation unit 1064, based on the assist information input by the positioning control unit 1062 and/or the positioning result by the GPS positioning device 112.

<Reliability Determination Method (Version 1)>

The reliability determination unit 1068 determines the WLAN positioning result based on the area information of the base station included in the assist information input by the positioning control unit 1062. When the WLAN positioning result is determined based on the area information of the base station, the positioning process by the A-GPS method and the positioning process by the WLAN positioning may be started in parallel. In the positioning process by the A-GPS method, it suffices if the process of obtaining the assist data is performed, and it is not necessary that the positioning with the assist data be performed.

The reliability determination unit 1068 obtains an area where the positioning device 100 is assumed to be located, based on the area information of the base station. For example, the reliability determination unit 1068 obtains the position of the base station included in the area information of the base station, and the reliability determination unit 1068 assumes (substitutes) that the position of the base station is the position of the positioning device 100 (hereinafter, it is called an "approximate position") and draws a circle centered on the approximate position. The approximate position may be indicated in terms of the longitude and latitude. The radius of the circle (hereinafter, it is called an "error radius") may be set, based on the information regarding the error on the position of the base station. For example, it may be within a range of error that is expected by assuming that the position of the base station is the position of the pointing device 100. Further, the information regarding the error on the position of the base station may include the information about the error radius. For example, the error radius may be set to be the radius of the area of the base station.

The reliability determination unit 1068 determines the reliability of the WLAN positioning result by comparing the WLAN positioning result and the approximate position. For example, when a distance between the approximate position and the WLAN positioning result is less than or equal to the error radius, the reliability determination unit 1068 determines that the reliability of the WLAN positioning result is high. On the other hand, when the distance between the approximate position and the WLAN positioning result exceeds the error radius, the reliability determination unit 1068 determines that the reliability of the WLAN positioning result is low.

Figure 4:
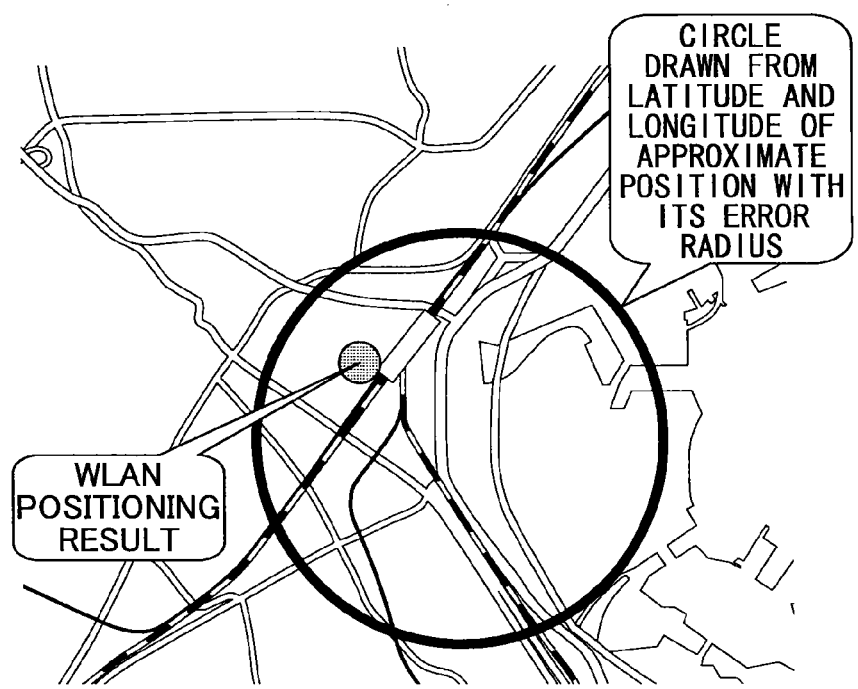
FIG. 4 is an explanatory diagram (version 1) explaining a determination method of determining reliability of a measurement result according to the embodiment.

FIG. 4 is a diagram (version 1) for explaining the process of the reliability determination unit 1068.

FIG. 4 shows a position indicating the WLAN positioning result and a circle centered on the approximate position and having a radius that is the error radius. In the example shown in FIG. 4, the WLAN positioning result exists within the circle. In the example shown in FIG. 4, since the distance between the approximate position and the WLAN positioning result is less than or equal to the error radius, it is determined that the reliability of the WLAN positioning result is high. When the reliability of the WLAN positioning result is high, the WLAN positioning result is adopted.

Figure 5:
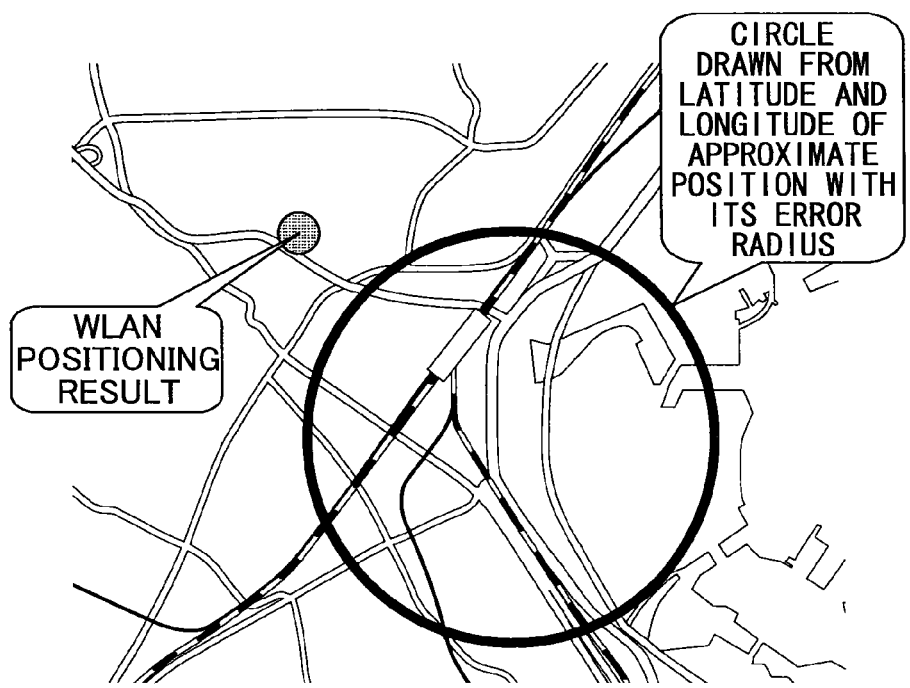
FIG. 5 is an explanatory diagram (version 2) explaining the determination method of determining the reliability of the measurement result according to the embodiment.

FIG. 5 is a diagram (version 2) for explaining the process of the reliability determination unit 1068.

FIG. 5 shows a position indicating the WLAN positioning result and a circle centered on the approximate position and having a radius that is the error radius. In the example shown in FIG. 4, the WLAN positioning result does not exist in the circle. In the example shown in FIG. 5, since the distance between the approximate position and the WLAN positioning result exceeds the error radius, it is determined that the reliability of the WLAN positioning result is low. When the reliability of the WLAN positioning result is low, the WLAN positioning result is not adopted.

<Reliability determination method (version 2)>

The reliability determination unit 1068 determines the WLAN positioning result, based on the GPS positioning result (measured position) input by the positioning control unit 1062. When the WLAN positioning result is determined based on the GPS positioning result, the history of the measured positions is accumulated. The history of the measured positions may includes measured positions that have been measured by the stand-alone positioning method, measured positions that have been obtained by the auto GPS function, measured positions that have been obtained by the single-shot positioning, and measured positions obtained by the tracking function. The auto GPS is a function that reports position information of a user to a service provider at every predetermined time interval. In the auto GPS, the position information is obtained at every predetermined time interval. Further, the position information that has been obtained by an autonomous method may be included. In the autonomous method, the positioning calculation is performed independently by the positioning device 100. No communications occur during this positioning.

The reliability determination unit 1068 compares the updated measured position (hereinafter, it is called the "last position") in the GPS positioning result with the WLAN positioning result. Here, the GPS positioning result is included in the history of the measured positions. For example, the area where the positioning device 100 is assumed to be located is obtained based on the last position. For example, a circle is drawn such that it is centered on the last position. The last position can be indicated in terms of the longitude and latitude. The radius of the circle (hereinafter, it is referred to as the position σ) may be set based on an "elapsed time" from the time period in which the last position has been measured, an "estimated speed" of the positioning device 100, and the "error radius of the last position." For example, the radius may be set by the formula (1).

$$\text{The position } \sigma = \text{the elapsed time} \times \text{the estimated speed} + \text{the error radius of the last position} \quad (1)$$

<Elapsed Time>

The elapsed time may be set based on a time stamp corresponding to the last position. The time stamp may be included in the history of the measured positions. Further, the elapsed time may be set based on a time at which the WLAN positioning has been completed in the device on which the positioning device 100 is mounted. Further, the time period counted by a system timer may be used as the elapsed time. Here, the system timer is implemented in the device on which the positioning device 100 is mounted.

<Estimated Speed>

When the positioning device 100 moves, the estimated speed may be set for each mode of transportation. For example, the estimated speed may be set by the following method.

1) The estimated speed is selected from two parameters.

For example, the two parameters include a fast movement and a low-speed movement. For example, when it is determined that the positioning device 100 is moving at a fast speed, the moving speed that is to be set when the positioning device 100 is moving at a fast speed is selected. For example, a moving speed of 80 km/h may be set. When it is detected that the serving base station is switched, whether the positioning device 100 is moving at a fast speed may be determined, for example, by the number of the detections. For example, when the positioning device 100 is mounted on the portable terminal device, a state determination unit 1072 may determine whether the positioning device 100 is moving at a fast speed, based on the number of times switching of the serving base station, which is input by a serving base station information acquisition unit 1074. The information regarding the serving base station is input to the state determination unit 1072. The state determination unit 1072 inputs information indicating whether the positioning device 100 is moving at a first speed to the reliability determination unit 1068. Whether the positioning device 100 is moving at a first speed may be determined based on the number of times switching within a predetermined time interval.

Further, when it is determined that the positioning device 100 is moving at a lower-speed, the moving speed that is to be set when the positioning device 100 is moving at a lower-speed is selected. For example, a lower-speed of 5 km/h may be set. For example, whether the positioning device 100 is moving at a lower-speed may be determined based on a detection result of a sensor. Specifically, whether the positioning device 100 is moving at a lower-speed may be determined by a value of a counted number of steps, which is to be detected, for example, by an acceleration sensor. Specifically, a walking detection unit 1076 inputs the value of the counted number of steps to the state determination unit 1072. The state determination unit 1072 determines whether the positioning device 100 is moving at a lower-speed, based on the value of the counted number of steps input by the walking detection unit 1076.

2) The estimated speed is selected from plural parameters.

For example, the plural parameters include moving speeds. For example, when it is determined that the positioning device 100 is moved by a high-speed train, the moving speed that is to be set when the positioning device 100 is moved by the high-speed train is selected. For example, the moving speed of 270 km/h may be set. The high-speed train includes the Shinkansen. For example, whether the positioning device 100 is moved by the high-speed train may be determined based on a detection result of a sensor. Specifically, whether the positioning device 100 is moved by the high-speed train may be determined based on a state detected by the acceleration sensor.

Further, for example, when it is determined that the positioning device 100 is moved by a train, the moving speed that is to be set when the positioning device 100 is moved by the train is selected. For example, a moving speed of 130 km/h may be set. Whether the positioning device 100 is moved by the train may be determined, for example, by a detection result of a sensor. Specifically, whether the positioning device 100 is moved by the train may be determined by a state detected by the acceleration sensor.

Further, for example, when it is determined that the positioning device 100 is moved by a car, the moving speed that is to be set when the positioning device 100 is moved by the car is selected. For example, a moving speed of 80 km/h may be set. Whether the positioning device 100 is moved by the car may be determined, for example, by a detection result of a sensor. Specifically, whether the positioning device 100 is moved by the car may be determined by a state detected by the acceleration sensor.

Further, for example, when it is determined that the positioning device 100 is to travel, the traveling speed that is to be set when the positioning device 100 is traveling is selected. For example, a traveling speed of 20 km/h may be set. Whether the positioning device 100 is traveling may be determined, for example, by a detection result of a sensor. Specifically, whether the positioning device 100 is traveling may be determined by a state detected by the acceleration sensor.

Further, for example, when it is determined that the positioning device 100 is moved on foot, the walking speed that is to be set when the positioning device 100 is moved on foot is selected. For example, a walking speed of 5 km/h may be set. Whether the positioning device 100 is moved on foot may be determined, for example, by a detection result of a sensor. Specifically, whether the positioning device 100 is moved on foot may be determined by a state detected by the acceleration sensor.

Specifically, a moving state detection unit 1078 inputs the acceleration information to the state determination unit 1072. The state determination unit 1072 determines a moving state of the positioning device 100 based on the acceleration information input by the moving state detection unit 1078.

3) Estimate the speed

For example, the moving speed may be estimated, and the estimated speed may be set. For example, switching of the serving base station information may be detected, and the moving speed may be estimated based on the number of the detections. The moving speed may be estimated by the number of times switching within a predetermined time interval. For example, when the positioning device 100 is mounted on the portable terminal device, the state determination unit 1072 may estimate the moving speed based on the number of times switching of the serving base station, which is to be input by the serving base station information acquisition unit 1074. The information regarding the serving base station is input to the state determination unit 1072. The state determination unit 1072 inputs the moving speed to the reliability determination unit 1068.

Further, for example, the moving speed may be estimated based on a detection result of a sensor. Specifically, the moving speed may be estimated based on a state detected by an acceleration sensor. Specifically, the moving state detection unit 1078 inputs the acceleration information to the state determination unit 1072. The state determination unit 1072 determines the moving state of the positioning device 100 based on the acceleration information input by the moving state detection unit 1078.

The reliability determination unit 1068 determines the reliability of the WLAN positioning result by comparing the WLAN positioning result with the last position. For example, when the distance between the last position and the WLAN positioning result is less than or equal to the position σ, the reliability determination unit 1068 determines that the reliability of the WLAN positioning result is high. On the other hand, when the distance between the last position and the WLAN positioning result exceeds the position σ, the reliability determination unit 1068 determines that the reliability of the WLAN positioning result is low.

Figure 6:
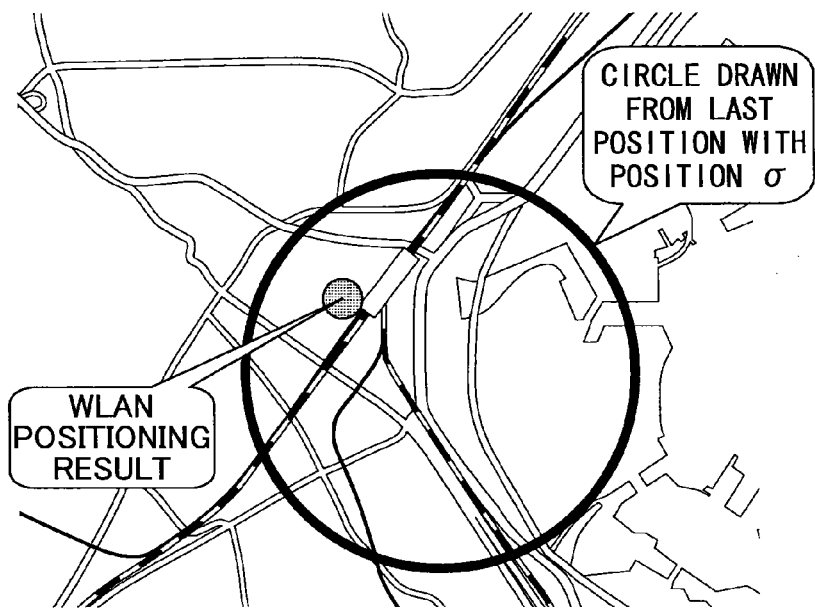
FIG. 6 is an explanatory diagram (version 3) explaining the determination method of determining the reliability of the measurement result according to the embodiment.

FIG. 6 is a diagram (version 3) for explaining the process of the reliability determination unit 1068.

FIG. 6 shows a position indicating the WLAN positioning result and a circle centered on the last position where the radius is set to be the position σ. In the example indicated in FIG. 6, the WLAN positioning result exists in the circle. In the example indicated in FIG. 6, since the distance between the last position and the WLAN positioning result is less than or equal to σ, it is determined that the reliability of the WLAN positioning result is high. When the reliability of the WLAN positioning result is high, the WLAN positioning result is adopted.

Figure 7:
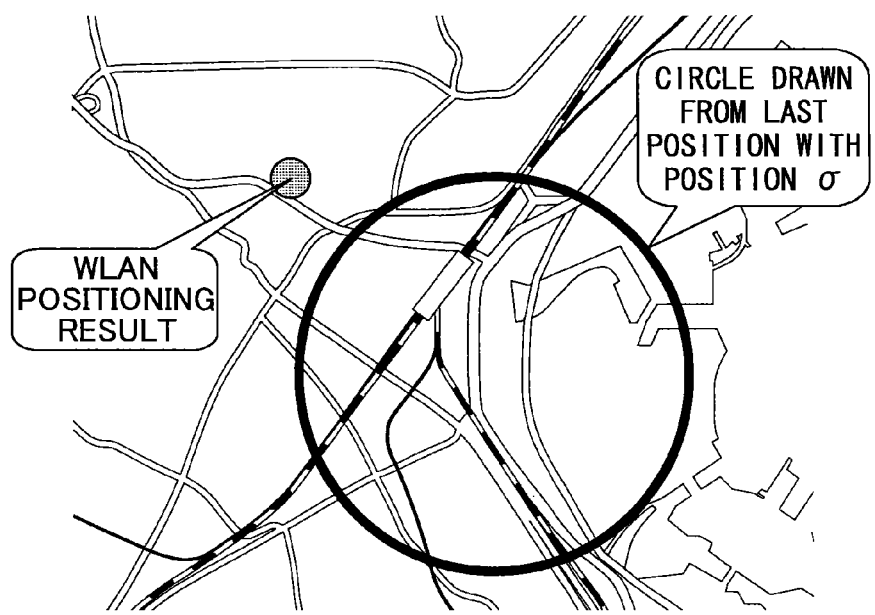
FIG. 7 is an explanatory diagram (version 4) explaining the determination method of determining the reliability of the measurement result according to the embodiment.

FIG. 7 is a diagram (version 4) for explaining the process of the reliability determination unit.

FIG. 7 shows a position indicating the WLAN positioning result and a circle centered on the last position where the radius is set to be the position σ. In the example shown in FIG. 7, the WLAN positioning result does not exist inside the circle. In the example shown in FIG. 7, since the distance between the last position and the WLAN positioning result exceeds the position σ, it is determined that the reliability of the WLAN positioning result is low. When the reliability of the WLAN positioning result is low, the WLAN positioning result is not adopted.

Further, the reliability determination unit 1068 determines the reliability of the accuracy of the WLAN measured position. For example, the reliability determination unit 1068 determines whether the positioning error of the WLAN positioning result is less than the error radius of the approximate position, based on the positioning error of the WLAN positioning result. When the positioning error of the WLAN positioning result is less than the error radius of the approximate position, it may be determined that the accuracy of the WLAN measured position is high, in other words, it may be determined that the reliability of the WLAN positioning result is high. On the other hand, when the positioning error of the WLAN positioning result is greater than or equal to the error radius of the approximate position, it may be determined that the accuracy of the WLAN measured position is low, in other words, it may be determined that the reliability of the WLAN positioning result is low. Further, when the positioning error of the WLAN positioning result is less than a predetermined threshold value (threshold value B), it may be determined that the accuracy of the WLAN measured position is high; in other words, it may be determined that the reliability of the WLAN positioning result is high. Contrary to this, when the positioning error of the WLAN positioning result is greater than or equal to the predetermined threshold value (the threshold value B), it may be determined that the accuracy of the WLAN measured position is low; in other words, it may be determined that the reliability of the WLAN positioning result is low.

When it is determined that the reliability of the WLAN positioning result is high, the reliability determination unit 1068 inputs the WLAN positioning result to a positioning result notification control unit 1070. In addition, when the reliability of the WLAN positioning result is determined to be high and the positioning accuracy of the WLAN positioning result is determined to be high, the reliability determination unit 1068 may input the WLAN positioning result to the positioning result notification control unit 1070.

Further, when it is determined that the reliability of the WLAN positioning result is low, the reliability determination unit 1068 obtains the GPS positioning result from the positioning control unit 1062. The reliability determination unit 1068 inputs the GPS positioning result to the positioning result notification control unit 1070. In addition, the reliability determination unit 1068 may input the approximate position to the positioning result notification control unit 1070.

The positioning device 100 includes the positioning result notification control unit 1070. The positioning result notification control unit 1070 is connected to the reliability determination unit 1068 and the local database 1066. The positioning result notification control unit 1070 performs control of reporting at least one of the WLAN positioning result, the GPS positioning result, and the approximate position, which are to be input by the reliability determination unit 1068, to a network. Further, when it is determined that the reliability of the WLAN positioning result is low, the positioning result notification control unit 1070 feeds back the GPS positioning result and the approximate position. The destination of the feedback may be the local database 1066 or a server including a database where the installation positions of the WLAN access points are registered. The server may exist on the network. Further, the information regarding the installation positions of the WLAN access points may be included in the base station.

The positioning device 100 includes the state determination unit 1072. The state determination unit 1072 determines a moving state of a user carrying the device, on which the positioning device 100 is mounted. The device can be the portable terminal device. For example, the serving base station information acquisition unit 1074 inputs the serving base station information to the state determination unit 1072. Further, the walking detection unit 1076 inputs the value of the counted steps to the state determination unit 1072. Further, the moving state detection unit 1078 inputs the information for determining the moving state to the state determination unit 1072. The information for determining the moving state includes the acceleration.

The state determination unit 1072 determines whether the positioning device 100 is moving at a fast speed, based on the serving base station information from the serving base station information acquisition unit 1074. The state determination unit 1072 determines whether the positioning device 100 is walking, based on the value of the counted steps from the walking detection unit 1076. The moving state detection unit 1078 inputs the information for determining the moving state to the state determination unit 1072. The state determination unit 1072 estimates the moving speed of the positioning device 100, based on the information for determining the moving state. The state determination unit 1072 inputs a determination result of whether the positioning device 100 is moving at a fast speed, a determination result of whether the positioning device 100 is walking, and the moving speed of the positioning device 100 to the reliability determination unit 1068. Information indicating a mode of transportation that is determined based on the moving speed may be input.

The device on which the positioning device 100 is mounted includes the serving base station information acquisition unit 1074. The device may be a portable terminal device. The positioning device 100 may include the serving base station information acquisition unit 1074. The serving base station information acquisition unit 1074 acquires the information regarding the serving base station where the portable terminal device is being served. For example, the serving base station information acquisition unit 1074 may acquire the serving base station information, when the portable terminal device performs hand-over and the serving base station is changed. Further, the serving base station information acquisition unit 1074 may acquire the information in every predetermined time interval. The serving base station information acquisition unit 1074 inputs the serving base station information to the state determination unit 1072. When the serving base station information acquisition unit 1074 has been set so as to acquire the serving base station information in every predetermined time interval, and when the serving base station information acquisition unit 1074 inputs the serving base station information to the state determination unit 1072, the serving base station information may be reported only if the acquired serving base station is changed (when it is different from the previous serving base station).

The device on which the positioning device 100 is mounted includes the walking detection unit 1076. The device may be the portable terminal device. The portable terminal device includes the walking detection unit 1076. The positioning device 100 may include the walking detection unit 1076. The walking detection unit 1076 determines whether the user carrying the portable terminal device is walking. For example, acceleration information and/or information regarding a number of steps is set. The walking detection unit 1076 determines whether the user is walking, based on the acceleration information and/or the information regarding the number of steps. For example, the walking detection unit 1076 counts the number of steps, and the walking detection unit 1076 estimates the acceleration based on the counted value. The walking detection unit 1076 may determine that the user is walking when the estimated value of the acceleration is less than a threshold value included in the acceleration information. The threshold value included in the acceleration information may be set to be a value representing a low acceleration state. The value representing the threshold value that is included in the low acceleration state may be the acceleration when the user is walking. Further, it may be determined that the user is walking, when the low acceleration state continues for a predetermined time interval. Further, when it is determined that the moving distance reaches a predetermined distance based on the information regarding the number of steps, it may be determined that the user is walking. When it is determined that the user is walking, the walking detection unit 1076 inputs the counted value of the steps to the state determination unit 1072. When it is determined that the user is not walking, the walking detection unit 1076 may input nothing. Alternatively, when it is determined that the user is not walking, the walking detection unit 1076 may input information indicating that the user is not walking to the state determination unit 1072.

The device on which the positioning device 100 is mounted includes the moving state detection unit 1078. The device may be the portable terminal device. The portable terminal device includes the moving state detection unit 1078. The positioning device 100 may include the moving state detection unit 1078. The moving state detection unit 1078 determines the moving state of the user carrying the portable terminal device 100. The moving state detection unit 1078 detects the acceleration. The moving state detection unit 1078 inputs the acceleration information to the state determination unit 1072. For example, the acceleration information for determining the mode of transportation is set in the state determination unit 1072. The state determination unit 1072 determines the moving state of the user based on the acceleration information for determining the mode of transportation. When the state determination unit 1072 determines that the user is moving by a mode of transportation, such as a high-speed train, a train, or a car, the state determination unit 1072 inputs the information indicating the mode of transportation to the reliability determination unit 1068. Further, when the state determination unit 1072 determines that the user is not moving by any mode of transportation, the state determination unit 1072 inputs nothing. Alternatively, when the state determination unit 1072 determines that the user is not moving by any mode of transportation, the state determination unit 1072 may input the information indicating that the user is not moving by any mode of transportation to the reliability determination unit 1068.

The portable terminal device on which the positioning device 100 is mounted may include plural CPUs. For example, among the functions shown in FIG. 3, the positioning control unit 1062, the WLAN positioning calculation unit 1064, the reliability determination unit 1068, the positioning result notification control unit 1070, and the state determination unit 1072 may be executed by an application CPU (A-CPU). The A-CPU is a CPU for controlling an application system. For example, the A-CPU controls various application functions and a user interface. Further, the process of the serving base station information acquisition unit 1074 may be performed by a communication CPU (C-CPU). The C-CPU is a CPU for controlling a transmission system. For example, the C-CPU controls communication operations, such as establishing connection with or terminating connection from a base station and a switching system.

<Operations of the system>

Figure 8:
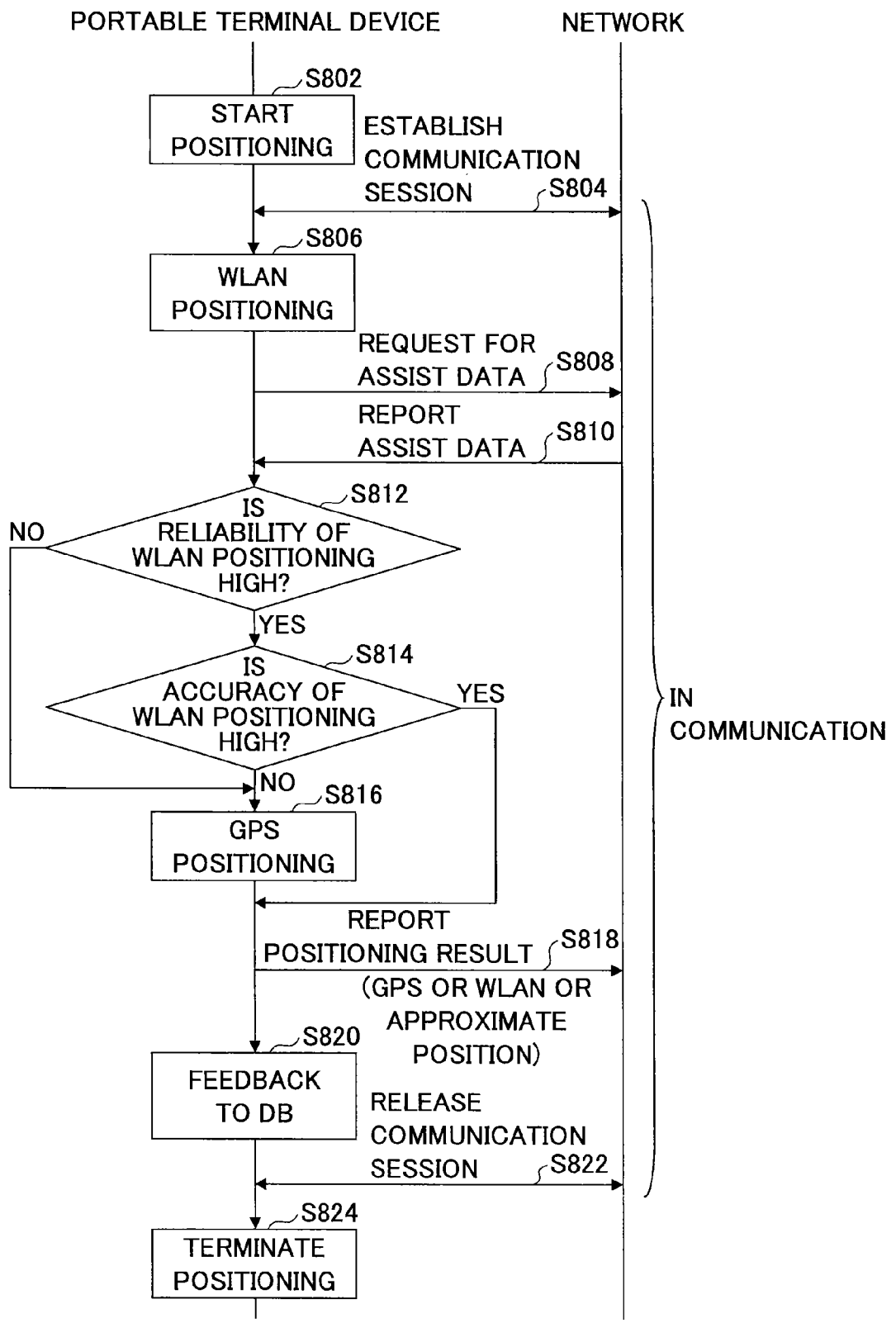
FIG. 8 is a flowchart illustrating an example of an operation of the system according to the embodiment.

FIG. 8 is a flowchart showing operations of the system. FIG. 8 shows an example where the positioning device 100 is mounted on the portable terminal device.

The portable terminal device starts positioning (step S802).

A communication session is established between the portable terminal device and a network (step S804).

The portable terminal device performs the WLAN positioning (step S806). For example, the positioning control unit 1062 obtains the identifiers of the access points and the received field strengths of the identifiers. The WLAN positioning calculation unit 1064 obtains the positions of the access points based on the identifiers of the access points input by the positioning control unit 1062, and calculates the WLAN measured position of the positioning device 100 based on the positions and the received field strengths.

The portable terminal device requests the network for the assist data (assist information) (step S808). For example, the positioning control unit 1062 requests the C-CPU for the assist data. In response to the request from the positioning control unit 1062, the C-CPU requests the assist data through the base station. Further, for example, the positioning control unit 1062 may request the GPS positioning device 112 for the assist data. The GPS positioning device 112 requests the communication control unit 110 for the assist data. The communication control unit 110 requests the assist data through the radio unit 102.

The network reports the assist data to the portable terminal device (step S810). The C-CPU inputs the assist data to the positioning control unit 1062. Alternatively, the GPS positioning device 112 may input the assist data to the positioning control unit 1062. The positioning control unit 1062 inputs the assist data to the reliability determination unit 1068.

The portable terminal device determines whether the reliability of the WLAN positioning result is high (step S812). For example, the reliability determination unit 1068 determines whether the reliability of the WLAN positioning result input by the WLAN positioning calculation unit 1064 is high, based on the assist data input by the positioning control unit 1062. For example, the distance between the WLAN positioning result and the approximate position is obtained, and it is determined whether the distance is less than the error radius of the approximate position.

When it is determined that the reliability of the WLAN positioning result is high (step S812: YES), the portable terminal device determines whether the accuracy of the WLAN positioning is high (step S814). For example, the reliability determination unit 1068 determines whether the error radius of the WLAN positioning result is less than the error radius of the approximate position.

The GPS positioning is performed (step S816), if it is determined that the reliability of the WLAN positioning is low (step S812: NO) at step S812, or if it is determined that the accuracy of the WLAN positioning is low (step S814: NO) at step S814. For example, when the reliability determination unit 1068 determines that the reliability of the WLAN positioning result is low or that the accuracy of the WLAN positioning is low, the reliability determination unit 1068 requests the positioning control unit 1062 to perform the GPS positioning. The positioning control unit 1062 requests the GPS positioning device 112 to perform the GPS positioning in accordance with the request from the reliability determination unit 1068. The GPS positioning may be performed based on the assist data reported at step S810.

When it is determined that the reliability of the WLAN positioning result is high at step S814, or after the GPS positioning has been performed at step S816, the portable terminal device reports the positioning result to the network (step S818). For example, when the reliability determination unit 1068 determines that the reliability of the WLAN positioning result is high, the positioning result notification control unit 1070 reports the WLAN positioning result to the network. Further, when it is determined that the reliability of the WLAN positioning result is low, the positioning control unit 1062 may report the GPS positioning result to the network. Additionally, when it is determined that the reliability of the WLAN positioning result is low, but the GPS positioning result is not obtained, the positioning result notification unit 1070 may report the approximate position to the network.

The portable terminal device feeds back the GPS positioning result or the approximate position to the local database 1066 (step S820). For example, the positioning result notification control unit 1070 feeds back the GPS positioning result or the approximate position to the local database 1066. Alternatively, the positioning result notification control unit 1070 may feed back the GPS positioning result or the approximate position to the server having the database in which the installation positions of the WLAN access points are registered. The database can be updated by feeding back the GPS positioning result or the approximate position.

The communication session between the portable terminal device and the network is released (step S822).

The positioning in the portable terminal device is terminated (step S824).

In the flowchart shown in FIG. 8, the reliability of the WLAN positioning result may be checked without performing steps S808 and S810. In the checking of the reliability, the reliability of the WLAN positioning is checked by comparing the last position with the WLAN positioning result, based on the history of the GPS measured positions.

When it is determined that the reliability of the WLAN positioning result is high, the WLAN positioning result is reported to the network. Further, when it is determined that the reliability of the WLAN positioning result is low, the last position may be reported to the network. When the last position is reported to the network, the last position may be feedbacked to the DB.

<Operations of the positioning device>

FIG. 9 is a flowchart showing operations of the positioning device.

The positioning device 100 starts the A-GPS positioning (step S902). For example, the GPS positioning device 112 starts the A-GPS positioning. For example, the GPS positioning device 112 performs the A-GPS positioning in accordance with the controlling of the positioning control unit 1062.

The positioning device 100 obtains the approximate position from the network by a procedure of the A-GPS (step S904). For example, the positioning control unit 1062 obtains the approximate position. The approximate position may be included in the assist information. For example, the position of the base station is obtained from the area information of the base station which is included in the assist information, and the position of the base station is set to be the approximate position of the positioning device 100.

On the other hand, the positioning device 100 starts the WLAN positioning (step S906). For example, the WLAN positioning calculation unit 1064 starts the WLAN positioning.

The positioning device 100 determines whether the WLAN positioning has been successful (step S908). For example, the WLAN positioning calculation unit 1064 determines whether the WLAN positioning has been successful.

When it is determined that the WLAN positioning has been successful (step S908: YES), the positioning device 100 determines whether the reliability of the WLAN positioning result is high (step S910). For example, the reliability determination unit 1068 determines whether the distance between the WLAN positioning result and the approximate position is less than or equal to the error radius of the approximate position.

When it is determined that the WLAN positioning has been unsuccessful (step S908: NO), or when it is determined that the distance between the WLAN positioning result and the approximate position is greater than the error radius of the approximate position (step S910: NO), the positioning device 100 executes the procedure of the A-GPS positioning (step S912), without using the WLAN positioning result. When the procedure of the A-GPS positioning has been executed, the positioning device 100 feeds back the finally obtained location information together with information regarding the access points (access point information: API) that are located in the vicinity of the positioning device 100. The location information includes the GPS positioning result which is obtained by the procedure of the A-GPS positioning and/or the approximate position. The access point information includes MAC (Media Access Control) addresses of the access points and the received signal strengths of the access points. The destination of the feedback may be the local database 1066 or the server having the database in which the installation positions of the WLAN access points are registered. Further, the destination of the feedback may be the base station in which the installation positions of the WLAN access points are registered.

When it is determined that the distance between the WLAN positioning result and the approximate position is less than or equal to the error radius of the approximate position (step S910: YES), the positioning device 100 determines whether the error radius of the approximate position is less than the error radius of the WLAN positioning result (step S914). For example, the reliability determination unit 1068 determines whether the error radius of the approximate position is less than the error radius of the WLAN positioning result. When the accuracy of the WLAN positioning result is low, the reliability is low. Therefore, the WLAN positioning result should not be adopted, even if it has been determined that the distance between the WLAN positioning result and the approximate position is less than or equal to the error radius. In the embodiment, when the error radius of the WLAN positioning result is greater than the error radius of the approximate position, it is determined that the accuracy of the WLAN positioning result is low. In other words, when the error radius of the WLAN positioning result is greater than the error radius of the approximate position, it is determined that the accuracy of the error radius of the approximate position is high.

When the error radius of the approximate position is less than the error radius of the WLAN positioning (step S914: YES), the positioning device 100 determines whether the error radius of the approximate position is less than a threshold value A. For example, the reliability determination unit 1068 determines whether the error radius of the approximate position is less than the threshold value A. When the error radius of the approximate position is large, the accuracy of the error radius of the approximate position is low. Therefore, the approximate position should not be adopted, even if it has been determined that the error radius of the approximate position is less than the error radius of the WLAN positioning. The threshold value A is defined based on an acceptable range for identifying the position. Additionally, the threshold value A may be defined depending on the accuracy required for the position.

When it is determined that the error radius of the approximate position is less than the threshold value A (step S916: YES), the positioning device 100 determines that the approximate position is the final positioning result (step S918). For example, when the reliability determination unit 1068 determines that the error radius of the approximate position is less than the threshold value A, since the reliability of the approximate position is high, the approximate position is set to be the final positioning result.

On the other hand, when it is determined that the error radius of the approximate position is not less than the threshold value A (step S916: NO), in other words, when it is determined that the error radius of the approximate position is greater than or equal to the threshold value A, the positioning device 100 performs the GPS positioning (step S920). For example, when the reliability determination unit 1068 determines that the error radius of the approximate position is greater than or equal to the threshold value A, the reliability determination unit 1068 determines that the accuracy of the error radius of the approximate position is low, and commands the positioning control unit 1062 to perform the A-GPS positioning. The positioning control unit 1062 commands the GPS positioning device 112 to perform the A-GPS positioning, in accordance with the command from the reliability determination unit 1068. The A-GPS positioning result is input from the GPS positioning device 112 to the reliability determination unit 1068 through the positioning control unit 1062.

The positioning device 100 determines whether the error radius of the WLAN positioning result is less than the error radius of the A-GPS positioning (step S922). For example, the reliability determination unit 1068 determines whether the error radius of the WLAN positioning result is less than the error radius of the A-GPS positioning. That is because it is preferable to adopt the positioning result having the smaller error radius. The determination may be performed by using the error radius of the approximate position, instead of the error radius of the WLAN positioning result.

When it is determined that the error radius of the WLAN positioning is less than the error radius of the A-GPS positioning (step S922: YES), the positioning device 100 determines that the approximate position is the final positioning result (step S918). For example, when the reliability determination unit 1068 determines that the error radius of the WLAN positioning is less than the error radius of the A-GPS positioning, the reliability determination unit 1068 determines that the approximate position is the final positioning result. The positioning result notification control unit 1070 reports the approximate position to the network. The positioning control unit 1062 may terminate the procedure of the A-GPS positioning.

On the other hand, when it is determined that the error radius of the WLAN positioning is not less than the error radius of the A-GPS positioning (step S922: NO), in other words, when it is determined that the error radius of the WLAN positioning is greater than or equal to the error radius of the A-GPS positioning, the positioning device 100 determines that the A-GPS positioning result is the final positioning result (step S924). For example, when the reliability determination unit 1068 determines that the error radius of the WLAN positioning is greater than or equal to the error radius of the A-GPS positioning, the reliability determination unit 1068 determines that the A-GPS positioning result as the final positioning result. That is because the accuracy of the A-GPS positioning result is higher. The positioning result notification control unit 1070 reports the A-GPS positioning result to the network. The positioning control unit 1062 may terminate the procedure of the positioning.

When the error radius of the approximate position is not less than the error radius of the WLAN positioning result at step S914, in other words, when the error radius of the approximate position is greater than or equal to the error radius of the WLAN positioning result (step S914: NO), the positioning device 100 determines that the accuracy of the WLAN positioning result is high, and determines whether the error radius of the WLAN positioning result is less than the threshold value B. For example, the reliability determination unit 1068 determines whether the error radius of the WLAN positioning result is less than the threshold value B. That is because, even if it has been determined that the error radius of the approximate position is greater than or equal to the error radius of the WLAN positioning result, an acceptable accuracy may not obtained, if the error radius of the WLAN positioning result is large. The threshold value B is defined based on an acceptable range for identifying the position. In addition, the threshold value B may be defined, depending on accuracy that is required for the position.

When it is determined that the error radius of the WLAN positioning result is less than the threshold value B (step S926: YES), the positioning device 100 determines that the accuracy of the WLAN positioning result is high, and determines that the WLAN positioning result is the final positioning result (step S928). For example, when the reliability determination unit 1068 determines that the error radius of the WLAN positioning result is less than the threshold value B, the reliability determination unit 1068 determines that the WLAN positioning result is the final positioning result. The positioning result notification control unit 1070 reports the WLAN positioning result to the network. The positioning control unit 1062 may terminate the procedure of the A-GPS positioning.

On the other hand, when it is determined that the error radius of the WLAN positioning result is not less than the threshold value B (step S926: NO), in other words, when it is determined that the error radius of the WLAN positioning result is greater than or equal to the threshold value B, the positioning device 100 performs the GPS positioning (step S930). For example, when the reliability determination unit 1068 determines that the error radius of the WLAN positioning result is greater than or equal to the threshold value B, the reliability determination unit 1068 commands the positioning control unit 1062 to perform the A-GPS positioning. The positioning control unit 1062 commands the GPS positioning device 112 to perform the A-GPS positioning, in accordance with the command from the reliability determination unit 1068. The A-GPS positioning result is input from the GPS positioning device 112 to the reliability determination unit 1068 through the positioning control unit 1062.

The positioning device 100 determines whether the error radius of the WLAN positioning result is less than the error radius of the A-GPS positioning (step S932). For example, the reliability determination unit 1068 determines whether the error radius of the WLAN positioning result is less than the error radius of the A-GPS positioning. That is because it is preferable to adopt the positioning result having the smaller error radius.

When it is determined that the error radius of the WLAN positioning is less than the error radius of the A-GPS positioning (step S932: YES), the positioning device 100 determines that the accuracy of the WLAN positioning result is high, and the positioning device 100 determines that the WLAN positioning result is the final positioning result (step S928). For example, when the reliability determination unit 1068 determines that the error radius of the WLAN positioning result is less than the error radius of the A-GPS positioning, the reliability determination unit 1068 determines that the WLAN positioning result is the final positioning result.

On the other hand, when it is determined that the error radius of the WLAN positioning result is not less than the error radius of the A-GPS positioning (step S932: NO), in other words, when it is determined that the error radius of the WLAN positioning result is greater than or equal to the error radius of the A-GPS positioning, the positioning device 100 determines that the accuracy of the A-GPS positioning result is high, and determines that the A-GPS positioning result is the final positioning result (step S934). For example, when the reliability determination unit 1068 determines that the error radius of the WLAN positioning is greater than or equal to the error radius of the A-GPS positioning, the reliability determination unit 1068 determines that the A-GPS positioning result is the final positioning result. That is because the accuracy of the A-GPS positioning is higher. The positioning result notification control unit 1070 reports the A-GPS positioning result to the network. The positioning control unit 1062 may terminate the procedure of the positioning.

In the flowchart shown in FIG. 9, the checking of the reliability of the WLAN positioning result at step S910 may be performed, without performing steps S902 and S904. In the checking of the reliability, the reliability of the WLAN positioning is checked by comparing the last position with the WLAN positioning result, based on the history of the GPS measured positions.

Further, the process of step S922 may be performed without performing step S920. At step S922, the error radius of the WLAN positioning result may be compared with the error radius of the last position.

Further, the process of step S932 may be performed without performing step S930. At step S932, the error radius of the WLAN positioning result may be compared with the error radius of the last position.

In the embodiment, instead of the GPS positioning method, the European Galileo system, the Russian GLONASS system, or another satellite positioning system may be adopted. In other words, a global navigation satellite system (GNSS) may be adopted.

According to the embodiment, the determination of as to whether the positioning result obtained by the WLAN positioning is reliable can be automatically performed. That has been one of the issues to be solved when the WLAN positioning is integrated with the GPS positioning system and commercially developed. Further, the determination of as to whether the accuracy of the positioning result obtained by the WLAN positioning is high, in other words, the determination of as to whether the accuracy of the positioning result is high may be automatically performed.

Specifically, filtering is performed by using the error radii which are associated with the latitude and longitude information of the "A-GPS positioning result" and the "approximate position (base station positioning result)" being utilized in the location information service. By the filtering, it can be ensured that the reliability of the location information that can be obtained by a user is not degraded, compared to conventional cases.

According to the embodiment, the WLAN positioning may be included in the positioning method, while ensuring the serviceability. Since it is possible to include the WLAN positioning, a highly precise positioning system can be realized. Here, the positioning system can save electric power.

In the embodiment, when the WLAN positioning is independently performed, some values that have been obtained from the database may not be utilized, if the values are incorrect.

Further, when it can be determined that the WLAN positioning result is reliable, and the WLAN positioning result is highly accurate, the GPS positioning may be omitted. Whether the WLAN positioning result is highly accurate may be determined by the error radius. The power consumption can be reduced by omitting the GPS positioning.

Further, when it is determined that the reliability of the WLAN positioning result being calculated based on the information from the database (DB) is low, the higher precision positional information may be fed back to the database. By the feedback, it can be triggered to update the database.

According to the embodiment, there is provided a positioning device for measuring the position.

The positioning device includes a WLAN positioning calculation unit that performs first positioning, based on first radio waves from access points;

a satellite positioning unit that functions as a GPS positioning device that performs second positioning, based on second radio waves from satellites;

a positioning result determination unit that determines whether a positioning result by the WLAN positioning calculation unit is within a predetermined range from position information or a measured position, based on the position information to be obtained during the second positioning by the satellite positioning unit or the measured position by the satellite positioning unit; and a positioning result adoption determination unit that functions as a reliability determination unit that determines whether the positioning result is adopted, based on a determined result by the positioning result determination unit.

It is possible to determine whether the WLAN positioning result is the reliable result. Since it is possible to determine whether the WLAN positioning result is the reliable result without frequently performing scanning of the WLAN access points, the power consumption can be reduced. Further, it is possible to determine whether the WLAN positioning result is the reliable result, regardless of whether the database has been updated. Since it is possible to add the WLAN positioning besides the GPS positioning, a high precision positioning system, which can reduce electric power consumption, can be realized, while ensuring serviceability.

Further, a measurement precision determination unit that functions as a reliability determination unit that determines whether measurement precision of the positioning result is acceptable, based on a positioning error of the positioning result by the WLAN positioning calculation unit is included.

The measurement precision of the positioning result by the WLAN positioning calculation unit can be determined.

Further, the positioning result determination unit determines reliability of the positioning result by determining whether a first distance between the position information and the positioning result by the WLAN positioning calculation unit is less than or equal to a first threshold value.

Further, the first threshold value is defined based on an error of the position information.

The reliability of the WLAN positioning result can be determined based on the position of a base station and the WLAN positioning result.

Further, a state determination unit that determines a moving state of the positioning device is included, and the positioning result determination unit determines the reliability of the positioning result by the WLAN positioning calculation unit, based on a history of the measured position and the moving state determined by the state determination unit.

The reliability of the WLAN positioning result can be determined, based on the history of the measured position by the GPS positioning and the moving state of the positioning device.

Further, the positioning result determination unit determines the reliability of the positioning result by determining whether a second distance between a newest measured position in the history of the measured position and the positioning result by the WLAN positioning calculation unit is less than or equal to a second threshold value.

Further, the second threshold value is defined based on a time elapsed since the newest measured position is measured and the moving state of the positioning device determined by the state determination unit.

The reliability of the WLAN positioning result can be determined based on the newest measured position and the WLAN positioning result.

Further, the WLAN positioning calculation unit detects locations of the access points from a database in which identifiers of the access points and the locations of the access points are associated, and the WLAN positioning calculation unit performs the first positioning based on the locations and received signal strengths of the first radio waves.

Further, a satellite measurement position acquisition unit that acquires a second measured position to be measured by the satellite positioning unit, when the positioning result determination unit determines that the positioning result is not adopted; and a positioning result notification unit that reports the second measured position acquired by the satellite measurement position acquisition unit or the positioning result by the WLAN positioning calculation unit to a network are included.

When it is determined that the reliability of the WLAN positioning result is low, the GPS positioning result and/or area information of the base station can be fed back to the database. Therefore, the reliability of the database can be improved.

According to the embodiment, there is provided a method for the positioning device that performs positioning.

The method includes a WLAN positioning calculation step of performing first positioning, based on first radio waves from access points;

a satellite positioning step of performing second positioning, based on second radio waves from satellites;

a measurement result determination step of determining whether a positioning result by the WLAN positioning calculation step is within a predetermined range from position information or a measured position, based on the position information to be obtained during the second positioning by the satellite positioning step or the measured position by the satellite positioning step; and a positioning result adoption determination step of determining whether the positioning result is adopted, based on a determined result by the measurement result determination step.

For convenience of the explanations, specific numerals have been used in the description in order to facilitate understandings of the present invention. However, these numerals are simply illustrative, and any other appropriate value may be used, except indicated otherwise.

Although the present invention has been described with reference to specific embodiments, these embodiments are simply illustrative, and various variations, modifications, alterations, substitutions and so on could be conceived by those skilled in the art. For convenience of the explanations, devices according to the embodiments of the present invention have been described by using functional block diagrams, but the devices may be implemented in hardware, software or combinations thereof. The present invention is not limited to the above-described embodiments, and various variations, modifications, alterations, substitutions and so on are included, without departing from the spirit of the present invention.

This international patent application is based on Japanese Priority Application No. 2010-121004 filed on May 26, 2010, the entire contents of which are hereby incorporated by reference.

LIST OF REFERENCE SYMBOLS

100: Positioning device
102: Radio unit
104: Storing unit
106: Central Processing Unit (CPU)
1062: Positioning control unit
1064: WLAN positioning calculation unit
1066: Local database
1068: Reliability determination unit
1070: Positioning result notification control unit
1072: State determination unit
1074: Serving base staion information acquisition unit
1076: Walking detection unit
1078: Moving state detection unit
108: Output unit
110: Communication control unit
112: GPS positioning device
$200_1, \ldots, 200_m$ (m is an integer such that m>0): Access points
$300_1, \ldots, 300_n$ (n is an integer such that n>3): GPS satellites

The invention claimed is:

1. A positioning device for measuring a position, the positioning device comprising:
    a WLAN positioning calculation unit configured to perform first positioning, based on radio waves from access points;
    a satellite positioning unit configured to perform second positioning, based on an assisted GPS (A-GPS) method;
    a positioning result determination unit configured to determine whether a positioning result by the WLAN positioning calculation unit exists within a predetermined range of position information; and
    a positioning result adoption determination unit configured to adopt the positioning result by the WLAN positioning calculation unit, when the positioning result determination unit determines that the positioning result by the WLAN positioning calculation unit is within the predetermined range of the position information,
    wherein the position information includes area information of a base station that is obtained by the assisted GPS-(A-GPS) method, and
    wherein, when the positioning result determination unit determines whether the positioning result by the WLAN positioning calculation unit exists within the predetermined range of the position information based on the area information of the base station, the first positioning by the WLAN positioning calculation unit and the second positioning by the satellite positioning unit are started in parallel, and, wherein, in the second positioning by the satellite positioning unit, the area information of the base station is obtained by the assisted GPS (A-GPS) method without performing satellite positioning.

2. The positioning device according to claim 1, further comprising:
    a measurement precision determination unit configured to determine whether measurement precision of the positioning result is acceptable, based on a positioning error of the positioning result by the WLAN positioning calculation unit.

3. The positioning device according to claim 1,
wherein the positioning result determination unit is configured to determine reliability of the positioning result by the WLAN positioning calculation unit by determining whether a distance between the position information and the positioning result by the WLAN positioning calculation unit is less than or equal to a threshold value.

4. The positioning device according to claim 3,
wherein the threshold value is defined based on an error of the position information.

5. The positioning device according to claim 1,
wherein the WLAN positioning calculation unit is configured to detect locations of the access points from a database in which identifiers of the access points and the locations of the access points are associated, and the WLAN positioning calculation unit performs the first positioning based on the locations and received signal strengths of the radio waves.

6. The positioning device according to claim 5, further comprising:
a satellite measurement position acquisition unit configured to acquire a second measured position to be measured by the satellite positioning unit, when the positioning result determination unit determines that the positioning result by the WLAN positioning calculation unit is not adopted; and
a positioning result notification unit configured to report the second measured position acquired by the satellite measurement position acquisition unit or the positioning result by the WLAN positioning calculation unit to a network.

7. A method executed by a positioning device configured to performs positioning, the method comprising:
a WLAN positioning calculation step of performing first positioning, based on first radio waves from access points;
a satellite positioning step of performing second positioning, based on an assisted GPS (A-GPS) method;
a measurement result determination step of determining whether a positioning result by the WLAN positioning calculation step is within a predetermined range of position information, and
a positioning result adoption determination step of adopting the positioning result by the WLAN positioning calculation step, when the measurement result determination step determines that the positioning result by the WLAN positioning calculation step is within the predetermined range of the position information,
wherein the position information includes area information of a base station that is obtained by the assisted GPS (A-GPS) method, and
wherein, when the positioning result determination step determines whether the positioning result by the WLAN positioning calculation step exists within the predetermined range of the position information based on the area information of the base station, the first positioning by the WLAN positioning calculation step and the second positioning by the satellite positioning step are started in parallel, and, wherein, in the second positioning by the satellite positioning step, the area information of the base station is obtained by the assisted GPS (A-GPS) method without performing satellite positioning.

8. A positioning device for measuring a position, the positioning device comprising:
circuitry configured to
perform first positioning, based on first radio waves from access points;
perform second positioning, based on an assisted GPS (A-GPS) method;
determine whether a positioning result from the first positioning exists within a predetermined range of position information; and
adopt a positioning result by the first positioning, when the positioning result is within the predetermined range of the position information,
wherein the position information includes area information of a base station that is obtained by the assisted GPS (A-GPS) method, and
wherein, when the circuitry determines whether the positioning result exists within the predetermined range of the position information based on the area information of the base station, the first positioning and the second positioning are started in parallel, and, wherein, in the second positioning, the area information of the base station is obtained by the assisted GPS (A-GPS) method without performing satellite positioning.

9. The positioning device according to claim 8, wherein the circuitry is further configured to determine whether measurement precision of the positioning result is acceptable, based on a positioning error of the positioning result.

10. The positioning device according to claim 8,
wherein the circuitry is further configured to determine reliability of the positioning result by determining whether a distance between the position information and the positioning result is less than or equal to a threshold value.

11. The positioning device according to claim 10,
wherein the threshold value is defined based on an error of the position information.

12. The positioning device according to claim 8,
wherein the circuitry is further configured to detect locations of the access points from a database in which identifiers of the access points and the locations of the access points are associated, and the circuitry performs the first positioning based on the locations and received signal strengths of the radio waves.

* * * * *